Nov. 29, 1955   G. L. DENISTON   2,725,303
PIGMENTED DEXTRAN AND METHOD OF PRODUCING IT
Filed Aug. 14, 1951

INVENTOR
GEORGE L. DENISTON
BY *Toulmin & Toulmin*
ATTORNEYS

United States Patent Office 2,725,303
Patented Nov. 29, 1955

2,725,303

PIGMENTED DEXTRAN AND METHOD OF PRODUCING IT

George L. Deniston, Dayton, Ohio, assignor to The Commonwealth Engineering Company of Ohio, Dayton, Ohio, a corporation of Ohio Application August 14, 1951, Serial No. 241,739

16 Claims. (Cl. 106—217)

This invention relates to the pigmentation of dextran and to the products produced thereby.

Dextran is a water soluble colloidal material ranging from whitish in coloration to a light tan in the dry powder state, the coloration varying with the degree of purity and the natural color of the basic materials employed in the formation of the dextran. The powder when wetted with water and kneaded becomes highly viscous and is difficult to handle in mechanical operations. Accordingly the incorporation of pigments into the dextran is not achieved by normal processes since the powder form will not accept pigmentation, and the gum form cannot be readily manipulated.

This invention contemplates the provision of new and novel processes for the production of a new pigmented dextran material in which the pigment is thoroughly incorporated in the dextran. Further the invention contemplates that the process may be accomplished on standard industrial equipment with a minimum of time, labor and expense.

In the practice of the invention the dry dextran is first treated with water in an amount which is dependent upon the nature of the mixing operation to be employed and thereafter the pigment is added to the dextran mass as mechanical working thereof proceeds. When the pigment has been thoroughly incorporated the mass may be dried and ground to a fine powder, or if preferred the pigmented material may be retained in a paste form.

The total amount of water utilized may vary between about 1% and 20% of the total mass present. The higher proportions of water may be employed in instances where a viscous mass is formed, but of sufficient fluidity that it may be beaten with a mechanical stirrer. It is desirable, in such cases, to add a small amount of an agent in which the dextran is insoluble, as for example ethyl, methyl or isopropyl alcohol, acetone or dioxane to control the viscosity. The added agent should not exceed 3% by weight of the total mass as precipitation and settling may result if greater concentrations are used.

In the preferred process of the invention the mechanical working is performed on a pair of heated mixing rolls rotating in opposite directions and which force the dextran mass and pigment therebetween. The proportion of water present in the mass in such operation may be as low as 1% and a dual function is performed by the water. First, the water renders the mass sufficiently plastic to be worked; secondly, the water at the temperature of the rolls will tend to evaporate off as steam creating between the roll and the mass a space occupied by steam, thus preventing sticking of the mass to the roll. This latter feature once the operation has been initiated is confined to only one of the rolls since adhesion to the other is desirable as will be noted more particularly hereinafter.

Pigments particularly suitable for the practice of the invention include titanium dioxide, chrome yellow iron oxide or orange, carbon black, chrome green and the naphthenates.

The invention will be more fully understood by reference to the following specific examples and the accompanying drawings wherein.

Example I

Figure 1:
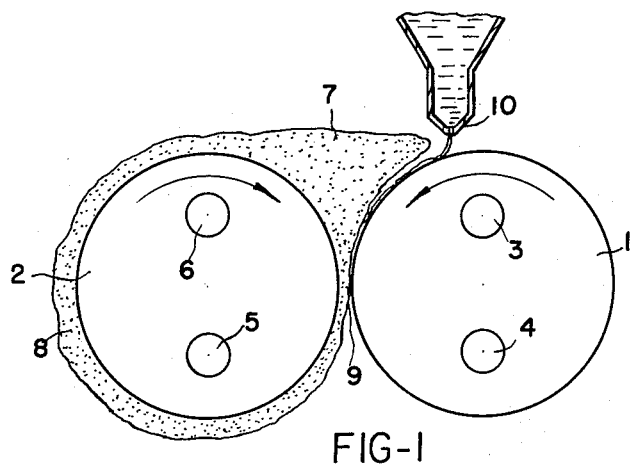
Figure 1 illustrates the essential equipment for roll mixing of the dextran and pigment, in end elevation.
Figure 2:
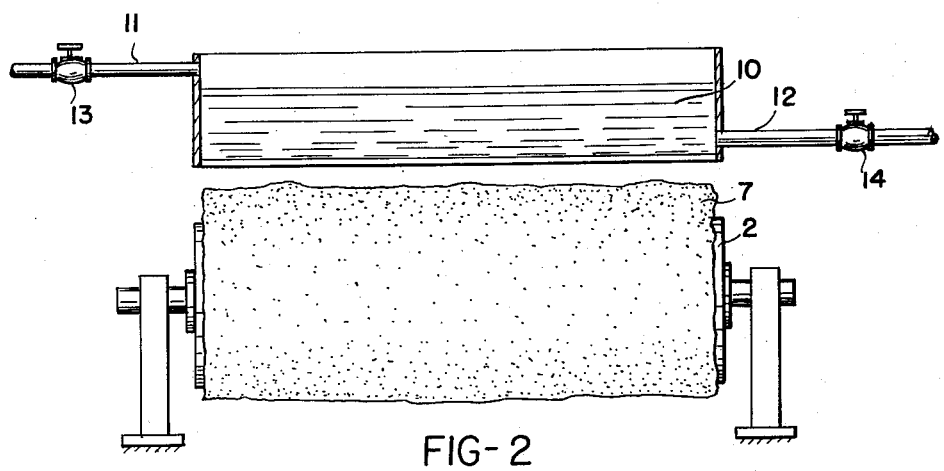
Figure 2 is a front view of the rolls of Figure 1.

There is shown in Figure 1 a pair of mixing rolls 1 and 2 spaced slightly apart and adapted to be driven individually by means (not shown) in opposite rotational directions as indicated by the arrows. The rolls are each provided internally with bores opening as at 3, 4, 5 and 6 and through which steam may be passed for heating of the rolls or through which water may be passed for cooling as required. Supported on the rolls as at 7 is shown a plastic mass comprising approximately by weight 90% dextran, 9% $TIO_2$ and 1% $H_2O$. This mass is also shown as wedged in the opening between the rolls at 9, and as passing around the forward rolls as at 2. Mounted above the forward portion of rear roll 1 is a drip device 10 which supplies a light stream of water to the surface of roll 1 adjacent the point of contact of the plastic mass and the roll. This device 10 as shown in Figure 2 is provided with water inlet 11 and outlet 12 and is provided with valves 13 and 14 for control of the water flow from a source and to a drain (not shown).

In operation the rolls are as noted driven in opposite rotational directions and the dextran mass is forced therebetween and around the forward roll 2. The mass is prevented from sticking to rear roll 1 which is heated to slightly more than 100° C., that is between about 105 and 110° C., by the evaporation of water at the point of contact of the mass with the roll 1. The steam formation has a slight solvation effect on the dextran in the immediate vicinity thereof and consequently a lubricating action exists at the contact point and down into the wedge causing the plastic mass to follow the forward roll 2.

The temperature of the forward roll 2 may be on the order of about 80–85° C. without occasioning any tendency of the mass to leave this roll during the mixing period. Thus under the conditions specified using 22″ rolls, 84″ long, a 200 pound batch of dextran and pigment may be handled readily, the operator of the unit if required cutting off strips of the material from the roll and mixing the same into the batch again during the operation as required. With this procedure a thorough mixing is assured.

Should the batch become excessively plastic and adhere unduly to roll 2 the roll may be cooled to temperatures as low as 40° C. if necessary without seriously affecting the operation. The necessity for such cooling will only arise however where particularly hard pigment materials are employed for under normal conditions the shearing of the dextran will not develop much heat and in this respect differs from rubber.

A batch of the formulation indicated above may be mixed in about 30 minutes, the product even when the original dextran was tan in color, being substantially pure white.

The product may be thoroughly dried and ground to powder form for use in paints or enamels, the high molecular weight of the dextran contributing to a good bodying action. The product may also contain up to about 8% of water to render it a paste and in this instance is particularly useful as a filler material or as a pigment in enamels of a water base.

Example II

A batch may be mixed on rolls, as in Example I, containing: dextran 73%; iron oxide 12%; water 8%; dibutyl phthalate 7%. A completely uniform mix of good red coloration may thus be obtained in about 35 minutes of mixing. It may be noted that since the water content is somewhat higher in this instance that the forward roll may preferably be operated at temperatures of about 55–60° C.

*Example III*

A yellow product may be produced on the mixing rolls by using the following components in the mix:

|  | Percent |
|---|---|
| Dextran | 78 |
| Chrome green | 8 |
| Water | 9 |
| Tricresyl phosphate | 5 |

The thorough mixing of the inert chrome green may require 35–45 minutes for a 200–250 pound batch on standard rolls and the final product may be prepared in paste or dry form.

*Example IV*

A uniform black product may be produced with the following formulation:

|  | Percent |
|---|---|
| Dextran | 65 |
| Carbon black | 20 |
| Water | 6 |
| Dioctyl phthalate | 9 | and the product may be prepared in paste or ground form as in the previous examples.

*Example V*

Figure 3:
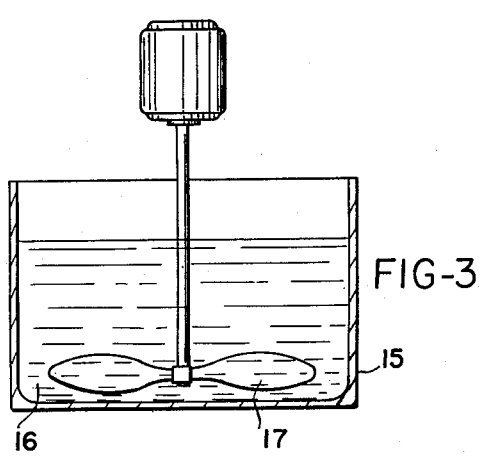
Figure 3 illustrates apparatus for the mixing of the dextran and pigment in fluid form.

In Figure 3 there is shown a mixing chamber 15 containing a batch of material 16 in which a high speed stirrer 17 is positioned. This equipment is preferably utilized where the end product is desired in paste form.

The batch 16 may consist of:

|  | Percent |
|---|---|
| Dextran | 64 |
| Carbon black | 12 |
| Water | 20 |
| Isopropyl alcohol | 3 | and batches of about 50 pound size may be readily handled with the simple apparatus shown.

The stirrer is preferably operated at speeds of between about 500–1000 R. P. M. and it is particularly important that speeds in this range be maintained during the initial stage of the mixing. Higher speeds, that is, of about 15,000 R. P. M. may, depending upon the dextran content, tend to cause granulation and settling in initial beating stage. Consequently lower speeds should be used for about the first 5 minutes and thereafter the speed may be increased to secure more thorough incorporation of the pigment. Heat at about 75° C. may be supplied to the mass to cause any deposited material to re-enter the fluid condition and may be employed to control fluidity.

The black paste produced in this room temperature operation may be utilized in paints, enamels, and as fillers.

*Example VI*

A paste may be produced as in Example V using the following constituents:

|  | Percent |
|---|---|
| Dextran | 70 |
| Water | 17 |
| Chrome yellow | 10 |
| Ethyl alcohol | 3 |

The resulting yellow paste may be used in a manner similar to that of the foregoing examples.

The dextran utilized in the foregoing examples is not limited by the average molecular weight of the material. Dextrans having a molecular weight of several millions may be readily milled, and may also be mixed in solution with a high water content of the mass. While dextrans of lower molecular weight, that is of the order of 30,000 to 100,000 may be more readily treated by a mixing operation in solution than the higher weights, milling is equally suitable for fractions having the lower molecular weights.

The pigments employed should be relatively finely ground prior to use particularly for use in the apparatus of Figure 3, but ordinary commercial grades are suitable for both processes.

The plasticizers may include any not chemically reactive with the dextran and include those generally employed in the pigmentation of other high molecular weight materials, e. g. rubber.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

I claim:

1. As a new article of manufacture, a pigmented composition consisting essentially of a minor amount of a finely divided inorganic pigment and, as a carrier and extender for the pigment, a major amount of dextran, said pigmented composition also including a small amount of a plasticizer selected from the group consisting of dibutyl phthalate, tricresyl phosphate and dioctyl phthalate.

2. As a new article of manufacture, a pigmented composition consisting essentially of, by weight, a minor amount of finely divided titanium dioxide, about 1% of water, a small amount of a plasticizer selected from the group consisting of dibutyl phthalate, tricresyl phosphate and dioctyl phthalate and, as a carrier and extender for the pigment, a major amount of dextran.

3. As a new article of manufacture, a pigmented composition consisting essentially of, by weight, about 12% of finely divided iron oxide, about 8% of water, about 7% of dibutyl phthalate and, as a carrier and extender for the pigment, about 73% of dextran.

4. As a new composition of matter, a pigmented composition consisting essentially of, by weight, about 8% of finely divided chrome green, about 5% of tricresyl phosphate, about 9% of water and, as a carrier and extender for the pigment, about 78% of dextran.

5. As a new composition of matter, a pigmented composition consisting essentially of, by weight, about 20% of finely divided carbon black, about 9% of dioctyl phthalate, about 6% of water and, as a carrier and extender for the pigment, about 65% of dextran.

6. A method of producing a composition consisting essentially of an inorganic ipgment and, as a carrier and extender for the pigment, dextran, which comprises passing a plastic mass consisting essentially of dextran, an inorganic pigment in an amount up to about 20% by weight, and water into the nip between a pair of rotatable surfaces rotating in opposite directions, one of said surfaces being maintained at a temperature of about 105–110° C. and the other of said surfaces being maintained at a temperature of about 40°–85° C., continuously projecting a stream of water between the mass passing through the nip of the surfaces and the surface heated to about 105–110° C., and rolling the mass between the surfaces in the presence of a steam phase created between the mass and the rotating surface maintained at 105–110° C. by volatilization of the projected water, the dextran in the vicinity of said last-mentioned surface being slightly solvated by the steam so that sticking of the mass to said surface is prevented and the mass is caused to adhere to, and carried forward by, the surface maintained at the temperature of about 40–85° C., the total amount of water in the mass during rolling thereof between the surfaces being between 1% and 20% by weight.

7. The method according to claim 6, in which the inorganic pigment is carbon black.

8. The method according to claim 6, in which the inorganic pigment is iron oxide.

9. The method according to claim 6, in which the inorganic pigment is chrome yellow.

10. The method according to claim 6, in which the mass also comprises up to about 3% by weight of an inorganic solvent in which the dextran is insoluble.

11. The method according to claim 6, in which the mass also comprises up to about 3% of isopropyl alcohol.

12. The method according to claim 6, in which the mass also comprises up to 3% of acetone.

13. The method according to claim 6, in which the mass also comprises a plasticizer for the dextran.

14. The method according to claim 6, in which the mass also comprises about 7% by weight of dibutyl phthalate as plasticizer for the dextran.

15. The method according to claim 6, in which the mass also comprises about 5% by weight of tricresyl phosphate, as plasticizer for the dextran.

16. The method according to claim 6, in which the mass also comprises about 9% by weight of dioctyl phthalate, as plasticizer for the dextran.

References Cited in the file of this patent

UNITED STATES PATENTS

| | | |
|---|---|---|
| 21,810 | Beardsley | Oct. 19, 1858 |
| 1,261,135 | Kohlins | Apr. 2, 1918 |
| 1,590,638 | Marquette | June 29, 1926 |
| 1,851,469 | Nerderosa | Mar. 29, 1932 |
| 1,866,743 | Abbott | July 12, 1932 |
| 2,085,512 | Schneider | June 29, 1937 |
| 2,503,623 | Luaces | Apr. 11, 1950 |
| 2,503,624 | Luaces | Apr. 11, 1950 |
| 2,544,363 | Siemons | Mar. 6, 1951 |

FOREIGN PATENTS

| | | |
|---|---|---|
| 151,448 | Germany | Oct. 22, 1903 |
| 116,129 | Sweden | Jan. 31, 1946 |